(12) United States Patent
Oh et al.

(10) Patent No.: US 10,116,939 B2
(45) Date of Patent: Oct. 30, 2018

(54) METHOD OF DERIVING MOTION INFORMATION

(71) Applicant: INFOBRIDGE PTE. LTD., Singapore (SG)

(72) Inventors: Soo Mi Oh, Seongnam (KR); Moonock Yang, Singapore (SG)

(73) Assignee: INFOBRIDGE PTE. LTD., Singapore (SG)

( * ) Notice: Subject to any disclaimer, the term of this patent is extended or adjusted under 35 U.S.C. 154(b) by 0 days.

(21) Appl. No.: 15/912,050

(22) Filed: Mar. 5, 2018

(65) Prior Publication Data

US 2018/0199038 A1    Jul. 12, 2018

Related U.S. Application Data

(63) Continuation of application No. 15/050,266, filed on Feb. 22, 2016, now Pat. No. 9,912,949, which is a
(Continued)

(30) Foreign Application Priority Data

Nov. 7, 2011    (KR) .................. 10-2011-0115220

(51) Int. Cl.
*H04N 19/124*    (2014.01)
*H04N 19/109*    (2014.01)
(Continued)

(52) U.S. Cl.
CPC ......... *H04N 19/124* (2014.11); *H04N 19/109* (2014.11); *H04N 19/119* (2014.11);
(Continued)

(58) Field of Classification Search
CPC .... H04N 19/124; H04N 19/52; H04N 19/109; H04N 19/119; H04N 19/176; H04N 19/105; H04N 19/51
See application file for complete search history.

(56) References Cited

U.S. PATENT DOCUMENTS

2007/0140352 A1    6/2007  Bhaskaran et al.
2007/0274385 A1*   11/2007 He .................. H04N 19/51
                                               375/240.12
(Continued)

FOREIGN PATENT DOCUMENTS

CN    101455087 A    6/2009
CN    101946516 A    1/2011
(Continued)

OTHER PUBLICATIONS

Budagavi et al., "Delta QP signaling at sub-LCU level," Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document: JCTVC-D038, pp. 1-5.
(Continued)

*Primary Examiner* — Obafemi Sosanya
(74) *Attorney, Agent, or Firm* — Birch, Stewart, Kolasch & Birch, LLP

(57) ABSTRACT

A method of encoding video data in a merge mode can include determining motion information of a current block; generating a prediction block of the current block using the motion information; generating a residual block using the current block and the prediction block; transforming the residual block to generate a transformed block; quantizing the transformed block using a quantization parameter and a quantization matrix to generate a quantized block; scanning coefficient components of the quantized block using a diagonal scan; entropy-coding the scanned coefficient components of the quantized block; and encoding the motion information, in which when the current block is a second prediction unit partitioned by asymmetric partitioning, the spatial merge candidate corresponding to a first prediction unit partitioned by the asymmetric partitioning is not to be listed on the merge list, the quantization parameter is determined per a quantization unit and is encoded using a
(Continued)

quantization parameter predictor, and a minimum size of the quantization unit is adjusted by a picture parameter set.

6 Claims, 15 Drawing Sheets

Related U.S. Application Data continuation of application No. 14/350,015, filed as application No. PCT/CN2012/084242 on Nov. 7, 2012, now Pat. No. 9,288,493.

(51) Int. Cl.

| | | |
|---|---|---|
| *H04N 19/119* | (2014.01) | |
| *H04N 19/176* | (2014.01) | |
| *H04N 19/52* | (2014.01) | |
| *H04N 19/91* | (2014.01) | |
| *H04N 19/503* | (2014.01) | |
| *H04N 19/159* | (2014.01) | |
| *H04N 19/513* | (2014.01) | |
| *H04N 19/593* | (2014.01) | |
| *H04N 19/463* | (2014.01) | |
| *H04N 19/196* | (2014.01) | |
| *H04N 19/13* | (2014.01) | |
| *H04N 19/129* | (2014.01) | |
| *H04N 19/61* | (2014.01) | |
| *H04N 19/139* | (2014.01) | |
| *H04N 19/137* | (2014.01) | |
| *H04N 19/86* | (2014.01) | |
| *H04N 19/51* | (2014.01) | |
| *H04N 19/105* | (2014.01) | |

(52) U.S. Cl.
CPC ........... *H04N 19/129* (2014.11); *H04N 19/13* (2014.11); *H04N 19/137* (2014.11); *H04N 19/139* (2014.11); *H04N 19/159* (2014.11); *H04N 19/176* (2014.11); *H04N 19/198* (2014.11); *H04N 19/463* (2014.11); *H04N 19/503* (2014.11); *H04N 19/513* (2014.11); *H04N 19/52* (2014.11); *H04N 19/593* (2014.11); *H04N 19/61* (2014.11); *H04N 19/86* (2014.11); *H04N 19/91* (2014.11)

(56) References Cited

U.S. PATENT DOCUMENTS

| | | | |
|---|---|---|---|
| 2008/0304562 | A1 | 12/2008 | Chang et al. |
| 2009/0213930 | A1* | 8/2009 | Ye ..................... H04N 19/176 375/240.03 |
| 2011/0013697 | A1 | 1/2011 | Choi et al. |
| 2012/0134416 | A1* | 5/2012 | Lin ..................... H04N 19/52 375/240.16 |
| 2012/0263231 | A1* | 10/2012 | Zhou ..................... H04N 19/52 375/240.12 |
| 2013/0077691 | A1* | 3/2013 | Zheng ................. H04N 19/105 375/240.16 |
| 2014/0247868 | A1* | 9/2014 | Oh ....................... H04N 19/124 375/240.03 |

FOREIGN PATENT DOCUMENTS

| | | |
|---|---|---|
| CN | 102186079 A | 9/2011 |
| JP | 2006-174014 A | 6/2006 |
| WO | WO 2013/064095 A1 | 5/2013 |
| WO | WO 2013/064098 A1 | 5/2013 |
| WO | WO 2013/064099 A1 | 5/2013 |
| WO | WO 2013/064100 A1 | 5/2013 |

OTHER PUBLICATIONS

International Search Report for PCT/CN2012/084242 filed on Nov. 7, 2012.

Kim et al., "CE2: Test results of asymmetric motion partition (AMP)," Joint Collaborative Team on Video Coding (JCT-VC) of ITU-T SG16 WP3 and ISO/IEC JTC1/SC29/WG11, 6th Meeting: Torino, Jul. 14-22, 2011, Document: JCTVC-F379, pp. 1-10.

Kobayashi et al., "CE4 Subtest 2: Delta QP prediction results of test 2.2.b and 2.3.f," Joint Collaborative Team on Video Coding (JCT-VC) of ITU-T SG16 WP3 and ISO/IEC JTC1/SC29/WG11, Document: JCTVC-F300, 6th Meeting, Torino, IT, Jul. 14-22, 2011, pp. 1-10.

Kondo et al., "Improvement of delta-QP Coding," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F422, pp. 1-6.

McCann et al., "HM3: High Efficiency Video Coding (HEVC) Test Model 3 Encoder Description," Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E602, 34 pages, XP30009013.

Sole et al., "CE11: Unified scans for the significance map and coefficient level coding in high efficiency," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F288, pp. 1-5.

Yuan et al., "Asymmetric motion partition with OBMC and Non-Square TU," Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E376, pp. 1-4.

Zheng et al., "CE9: Unified Merge and AMVP candidates selection (UN103)," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F297, pp. 1-3, XP30009320.

Zhou et al., "A study on HM3.0 parsing throughput issue," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F068, pp. 1-22.

Zhou, "Parallelized merge/skip mode for HEVC," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F069, pp. 1-13.

\* cited by examiner

METHOD OF DERIVING MOTION INFORMATION

CROSS-REFERENCE TO RELATED APPLICATIONS

This application is a Continuation of application Ser. No. 15/050,266, filed on Feb. 22, 2016, (now U.S. Pat. No. 9,912,949 issued on Mar. 6, 2018), which is a Continuation of copending application Ser. No. 14/350,015, filed on Apr. 4, 2014, (now U.S. Pat. No. 9,288,493 issued on Mar. 15, 2016), which was filed as a National Phase of PCT International Application No. PCT/CN2012/084242 on Nov. 7, 2012, which claims priority under 35 U.S.C. § 119(a) to Application No. 10-2011-0115220, filed in the Republic of Korea on Nov. 7, 2011, all of which are hereby expressly incorporated by reference into the present application.

BACKGROUND OF THE INVENTION

Field of the invention

The present invention relates to a method of deriving motion information, and more particularly, to a method of deriving motion information in merge mode by constructing a merge candidate list using spatial and temporal merge candidates.

Discussion of the Related Art

Methods for compressing video data include MPEG-2, MPEG-4 and H.264/MPEG-4 AVC. According to these methods, one picture is divided into macroblocks to encode an image, the respective macroblocks are encoded by generating a prediction block using inter prediction or intra prediction. The difference between an original block and the prediction block is transformed to generate a transformed block, and the transformed block is quantized using a quantization parameter and one of a plurality of predetermined quantization matrices. The quantized coefficient of the quantized block are scanned by a predetermined scan type and then entropy-coded. The quantization parameter is adjusted per macroblock and encoded using a previous quantization parameter.

In H.264/MPEG-4 AVC, motion estimation is used to eliminate temporal redundancy between consecutive pictures. To detect the temporal redundancy, one or more reference pictures are used to estimate motion of a current block, and motion compensation is performed to generate a prediction block using motion information. The motion information includes one or more reference picture indexes and one or more motion vectors.

According to the H.264/MPEG-4 AVC, only the motion vectors are predicted and encoded using neighboring motion vectors, and the reference picture indexes are encoded without neighboring reference picture indexes.

However, if various sizes are used for inter prediction, the correlation between motion information of a current block and motion information of one or more neighboring block increases. Also, the correlation between motion vector of a current block and motion vector of neighboring block within a reference picture becomes higher as the picture size becomes larger if motion of image is almost constant or slow. Accordingly, the conventional compression method described above decreases compression efficiency of motion information if the picture size is larger than that of high-definition picture and various sizes are allowed for motion estimation and motion compensation.

SUMMARY OF THE INVENTION

The present invention is directed to a method of deriving motion information by constructing a merge candidate list using spatial merge candidates and temporal candidate.

One aspect of the present invention provides a method of deriving motion information of a current prediction unit, comprising: extracting a merge index from a bit stream; constructing a merge candidate list using available spatial and temporal merge candidates; selecting a merge predictor among merge candidates listed in the merge candidate list using the merge index; and setting motion information of the merge predictor as motion information of the current prediction unit. The temporal merge candidate includes a reference picture index and a motion vector, zero is set as the reference picture index of the temporal merge candidate, and a motion vector of a temporal merge candidate block of a temporal merge candidate picture is set as the motion vector of the temporal merge candidate.

A method according to the present invention extracts a merge index from a bit stream, constructs a merge candidate list using available spatial and temporal merge candidates, selects a merge predictor among merge candidates listed in the merge candidate list using the merge index, and sets motion information of the merge predictor as motion information of the current prediction unit. The temporal merge candidate includes a reference picture index and a motion vector, zero is set as the reference picture index of the temporal merge candidate, and a motion vector of a temporal merge candidate block of a temporal merge candidate picture is set as the motion vector of the temporal merge candidate. Accordingly, the coding efficiency of the motion information is improved by including various merge candidates. Also, the computational complexity of an encoder and a decoder is reduced maintaining improvement of coding efficiency by adaptively storing motion information of reference picture and adaptively generating a temporal merge candidate.

DETAILED DESCRIPTION OF THE INVENTION

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

An image encoding apparatus and an image decoding apparatus according to the present invention may be a user terminal such as a personal computer, a personal mobile terminal, a mobile multimedia player, a smartphone or a wireless communication terminal. The image encoding device and the image decoding device may be include a communication unit for communicating with various devices, a memory for storing various programs and data used to encode or decode images.

Figure 1:
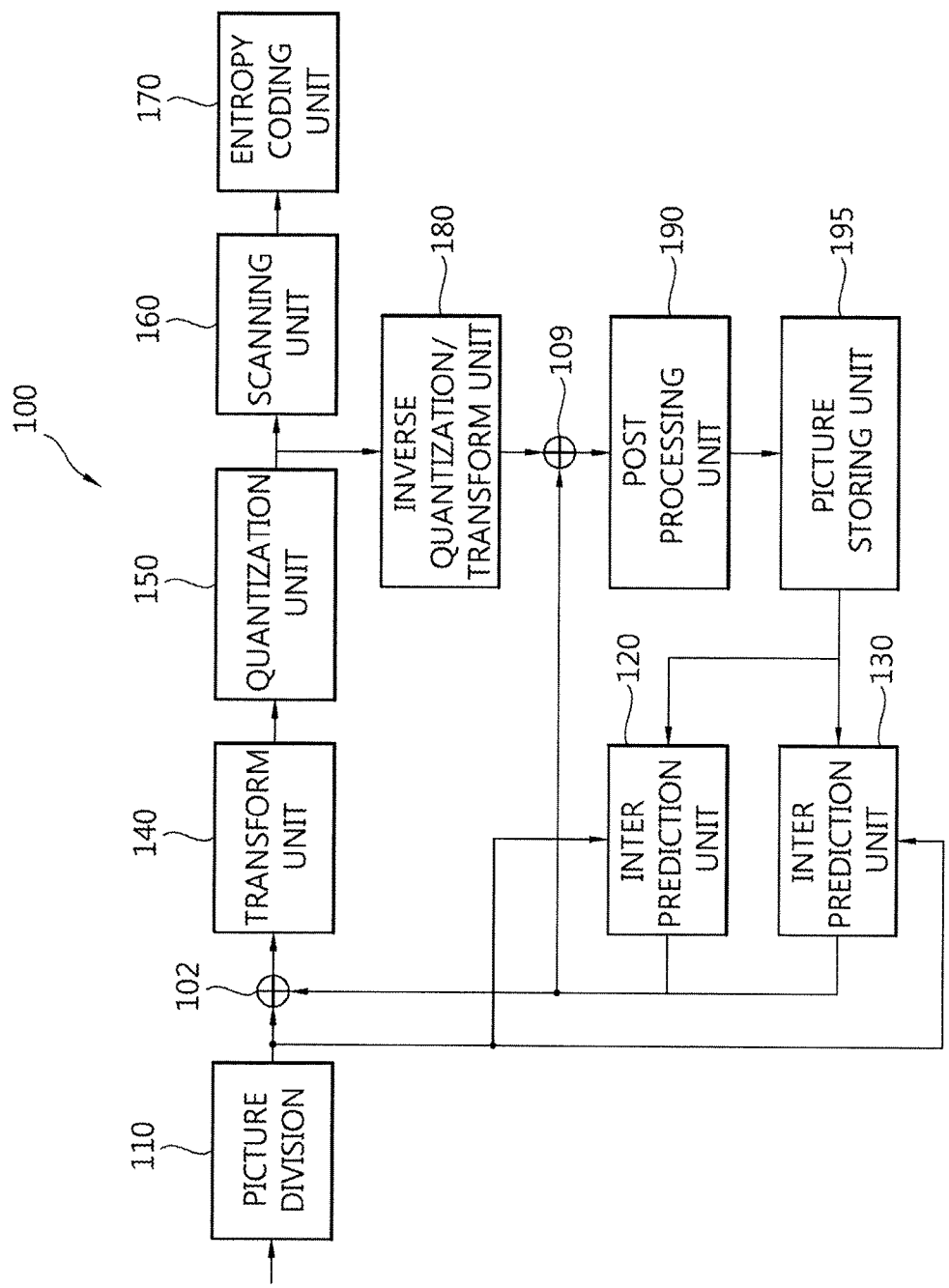
FIG. 1 is a block diagram of an image coding apparatus according to the present invention.

FIG. 1 is a block diagram of an image coding apparatus 100 according to the present invention.

Referring to FIG. 1, the image coding apparatus 100 according to the present invention includes a picture division unit 110, an intra prediction unit 120, an inter prediction unit 130, a transform unit 140, a quantization unit 150, a scanning unit 160, an entropy coding unit 170, an inverse quantization/transform unit 180, a post-processing unit 190 and a picture storing unit 195.

The picture division unit 110 divides a picture or a slice into plural largest coding units (LCUs), and divides each LCU into one or more coding units. The size of LCU may be 32×32, 64×64 or 128×128. The picture division unit 110 determines prediction mode and partitioning mode of each coding unit.

An LCU includes one or more coding units. The LCU has a recursive quad tree structure to specify a division structure of the LCU. Parameters for specifying the maximum size and the minimum size of the coding unit are included in a sequence parameter set. The division structure is specified by one or more split coding unit flags (split_cu_flags). The size of a coding unit is 2N×2N. If the size of the LCU is 64×64 and the size of a smallest coding unit (SCU) is 8×8, the size of the coding unit may be 64×64, 32×32, 16×16 or 8×8.

A coding unit includes one or more prediction units. In intra prediction, the size of the prediction unit is 2N×2N or N×N. In inter prediction, the size of the prediction unit is specified by the partitioning mode. The partitioning mode is one of 2N×2N, 2N×N, N×2N and N×N if the coding unit is partitioned symmetrically. The partitioning mode is one of 2N×nU, 2N×nD, nL×2N and nR×2N if the coding unit is partitioned asymmetrically. The partitioning modes are allowed based on the size of the coding unit to reduce complexity of hardware. If the coding unit has a minimum size, the asymmetric partitioning is not allowed. Also, if the coding unit has the minimum size, N×N partitioning mode may not be allowed.

A coding unit includes one or more transform units. The transform unit has a recursive quad tree structure to specify a division structure of the coding unit. The division structure is specified by one or more split transform unit flags (split_tu_flags). Parameters for specifying the maximum size and the minimum size of the luma transform unit are included in a sequence parameter set.

The intra prediction unit 120 determines an intra prediction mode of a current prediction unit and generates a prediction block using the intra prediction mode.

The inter prediction unit 130 determines motion information of a current prediction unit using one or more reference pictures stored in the picture storing unit 195, and generates a prediction block of the prediction unit. The motion information includes one or more reference picture indexes and one or more motion vectors.

The transform unit 140 transforms a residual block to generate a transformed block. The residual block has the same size of the transform unit. If the prediction unit is larger than the transform unit, the residual signals between the current block and the prediction block are partitioned into multiple residual blocks.

The quantization unit 150 determines a quantization parameter for quantizing the transformed block. The quantization parameter is a quantization step size. The quantization parameter is determined per quantization unit. The size of the quantization unit may vary and be one of allowable sizes of coding unit. If a size of the coding unit is equal to or larger than a minimum size of the quantization unit, the coding unit becomes the quantization unit. A plurality of coding units may be included in a quantization unit of minimum size. The minimum size of the quantization unit is determined per picture and a parameter for specifying the minimum size of the quantization unit is included in a picture parameter set.

The quantization unit 150 generates a quantization parameter predictor and generates a differential quantization parameter by subtracting the quantization parameter predictor from the quantization parameter. The differential quantization parameter is entropy-coded.

The quantization parameter predictor is generated by using quantization parameters of neighboring coding units and a quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameters are available, an average of the left and above quantization parameters is set as the quantization parameter predictor. If only one of the left and above quantization parameters is available, an average of the available quantization parameter and the previous quantization parameters is set as the quantization parameter predictor. If both of the left and above quantization parameters are unavailable, the previous quantization parameter is set as the quantization parameter predictor. The average is rounded off.

The differential quantization parameter is converted into bins for the absolute value of the differential quantization parameter and a bin for indicating sign of the differential quantization parameter through a binarization process, and the bins are arithmetically coded. If the absolute value of the differential quantization parameter is 0, the bin for indicating sign may be omitted. Truncated unary is used for binarization of the absolute.

The quantization unit 150 quantizes the transformed block using a quantization matrix and the quantization parameter to generate a quantized block. The quantized block is provided to the inverse quantization/transform unit 180 and the scanning unit 160.

The scanning unit 160 determines applies a scan pattern to the quantized block.

In inter prediction, a diagonal scan is used as the scan pattern if CABAC is used for entropy coding. The quantized coefficients of the quantized block are split into coefficient components. The coefficient components are significant flags, coefficient signs and coefficient levels. The diagonal scan is applied to each of the coefficient components. The significant coefficient indicates whether the corresponding quantized coefficient is zero or not. The coefficient sign indicates a sign of non-zero quantized coefficient, and the coefficient level indicates an absolute value of non-zero quantized coefficient.

When the size of the transform unit is larger than a predetermined size, the quantized block is divided into multiple subsets and the diagonal scan is applied to each subset. Significant flags, coefficient signs and coefficients levels of each subset are scanned respectively according to the diagonal scan. The predetermined size is 4×4. The subset is a 4×4 block containing 16 transform coefficients.

The scan pattern for scanning the subsets is the same as the scan pattern for scanning the coefficient components. The significant flags, the coefficient signs and the coefficients levels of each subset are scanned in the reverse direction. The subsets are also scanned in the reverse direction.

A parameter indicating last non-zero coefficient position is encoded and transmitted to a decoding side. The parameter indicating last non-zero coefficient position specifies a position of last non-zero quantized coefficient within the quantized block. A non-zero subset flag is defined for each subset other than the first subset and the last subset and is transmitted to the decoding side. The first subset covers a DC coefficient. The last subset covers the last non-zero coefficient. The non-zero subset flag indicates whether the subset contains non-zero coefficients or not.

The entropy coding unit 170 entropy-codes the scanned component by the scanning unit 160, intra prediction information received from the intra prediction unit 120, motion information received from the inter prediction unit 130, and so on.

The inverse quantization/transform unit 180 inversely quantizes the quantized coefficients of the quantized block, and inversely transforms the inverse quantized block to generate residual signals.

The post-processing unit 190 performs a deblocking filtering process for removing blocking artifact generated in a reconstructed picture.

The picture storing unit 195 receives post-processed image from the post-processing unit 190, and stores the image in picture units. A picture may be a frame or a field.

Figure 2:
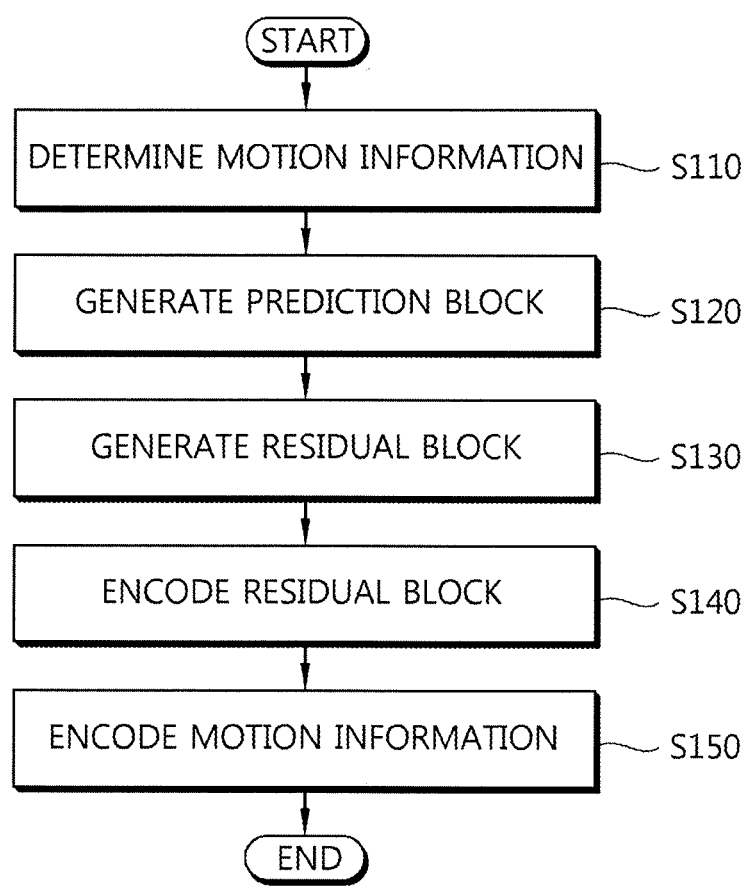
FIG. 2 is a flow chart illustrating a method of encoding video data in an inter prediction mode according to the present invention.

FIG. 2 is a flow chart illustrating a method of encoding video data in an inter prediction mode according to the present invention.

Motion information of a current block is determined (S110). The current block is a prediction unit. A size of the current block is determined by a size and a partitioning mode of the coding unit.

The motion information varies according to a prediction type. If the prediction type is a uni-directional prediction, the motion information includes a reference index specifying a picture of a reference list 0, and a motion vector. If the prediction type is a bi-directional prediction, the motion information includes two reference indexes specifying a picture of a reference list 0 and a picture of a reference list 1, and a list 0 motion vector and a list 1 motion vector.

A prediction block of the current block is generated using the motion information (S120). If the motion vector indicates a pixel position, the prediction block is generated by copying a block of the reference picture specified by the motion vector. If the motion vector indicates a sub-pixel position, the prediction block is generated by interpolating the pixels of the reference picture.

A residual block is generated using the current block and the prediction block (S130). The residual block has the same size of the transform unit. If the prediction unit is larger than the transform unit, the residual signals between the current block and the prediction block are into multiple residual blocks.

The residual block is encoded (S140). The residual block is encoded by the transform unit 140, the quantization unit 150, the scanning unit 160 and the entropy coding unit 170 of FIG. 1.

The motion information is encoded (S150). The motion information may be encoded predictively using spatial candidates and a temporal candidate of the current block. The motion information is encoded in a skip mode, a merge mode or an AMVP mode. In the skip mode, the prediction unit has the size of coding unit and the motion information is encoded using the same method as that of the merge mode. In the merge mode, the motion information of the current prediction unit is equal to motion information of one candidate. In the AMVP mode, the motion vector of the motion information is predictively coded using one or more motion vector candidate.

Figure 3:
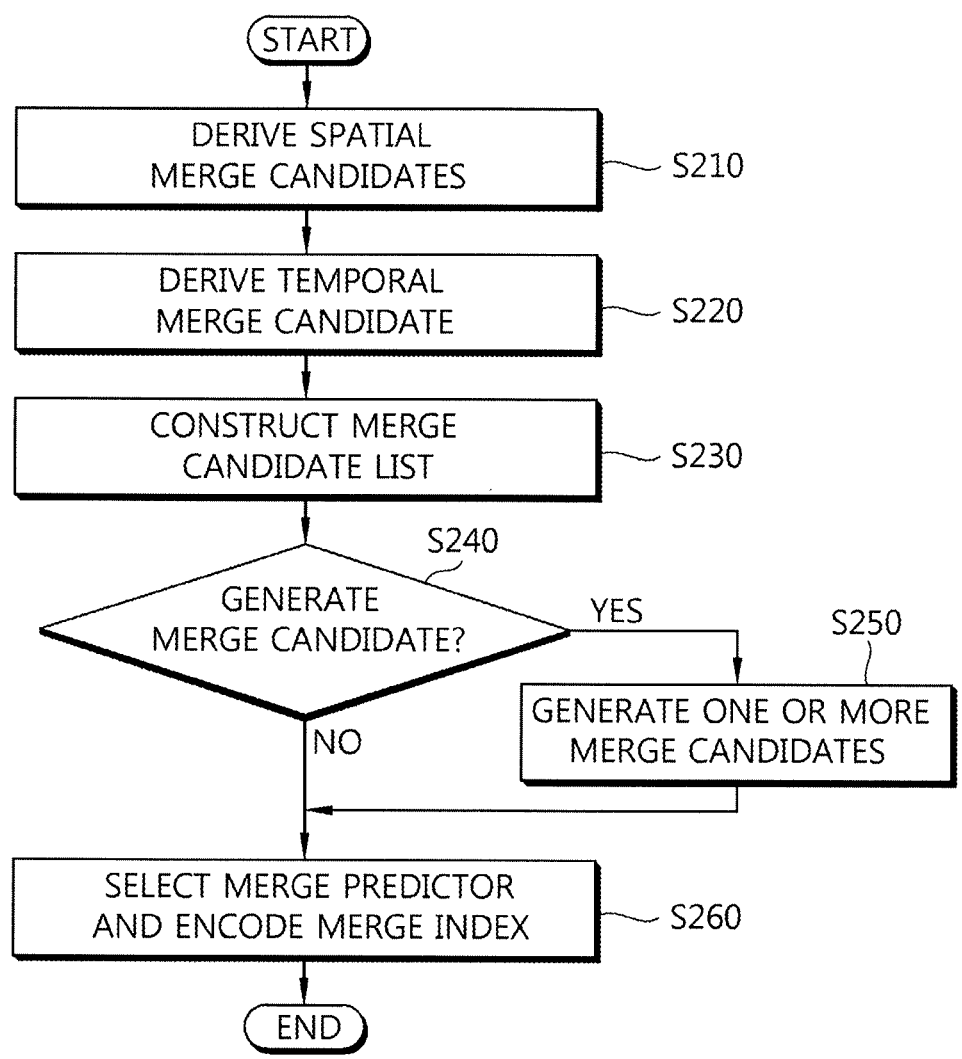
FIG. 3 is a flow chart illustrating a method of encoding motion information in a merge mode according to the present invention.

FIG. 3 is a flow chart illustrating a method of encoding motion information in the merge mode according to the present invention.

Figure 4:
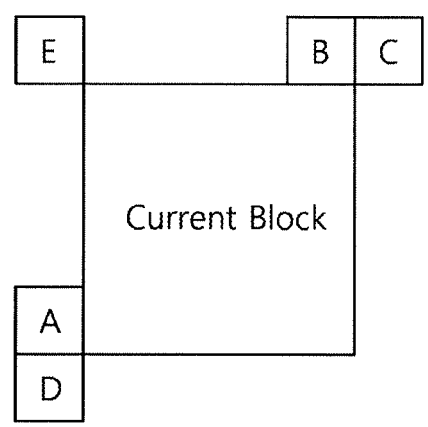
FIG. 4 is a conceptual diagram illustrating positions of spatial merge candidate blocks according to the present invention.

Spatial merge candidates are derived (S210). FIG. 4 is a conceptual diagram illustrating positions of spatial merge candidate blocks according to the present invention.

As shown in FIG. 4, the merge candidate block is a left block (block A), an above block (block B), an above-right block (block C), a left-below block (block D) or an above-left block (block E) of the current block. The blocks are prediction blocks. The above-left block (block E) is set as merge candidate block when one or more of the blocks A, B, C and D are unavailable. The motion information of an available merge candidate block N is set as a spatial merge candidate N. N is A, B, C, D or E.

The spatial merge candidate may be set as unavailable according to the shape of the current block and the position of the current block. For example, if the coding unit is split into two prediction units (block P0 and block P1) using asymmetric partitioning, it is probable that the motion information of the block P0 is not equal to the motion information of the block P1. Therefore, if the current block is the asymmetric block P1, the block P0 is set as unavailable candidate block as shown in FIGS. 5 to 8.

Figure 5:
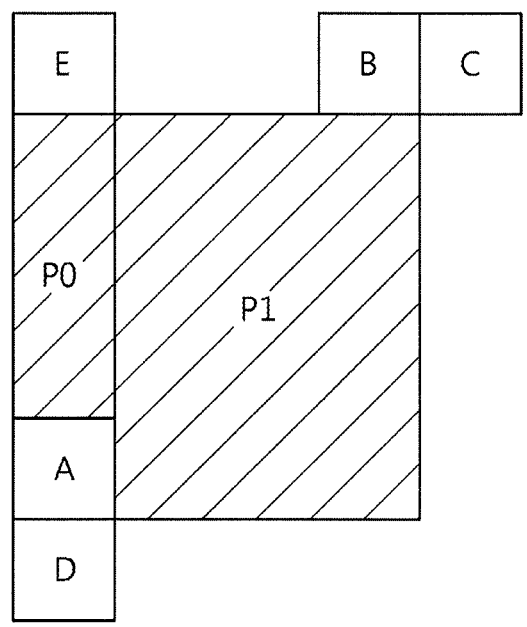
FIG. 5 is a conceptual diagram illustrating positions of spatial merge candidate blocks in an asymmetric partitioning mode according to the present invention.

FIG. 5 is a conceptual diagram illustrating positions of spatial merge candidate blocks in an asymmetric partitioning mode according to the present invention.

As shown in FIG. 5, a coding unit is partitioned into two asymmetric prediction blocks P0 and P1 and the partitioning mode is an nL×2N mode. The size of the block P0 is hN×2N and the size of the block P1 is (2−h)N×2N. The value of h is ½. The current block is the block P1. The blocks A, B, C, D and E are spatial merge candidate blocks. The block P0 is the spatial merge candidate block A.

In present invention, the spatial merge candidate A is set as unavailable not to be listed on the merge candidate list. Also, the spatial merge candidate block B, C, D or E having the same motion information of the spatial merge candidate block A is set as unavailable.

Figure 6:
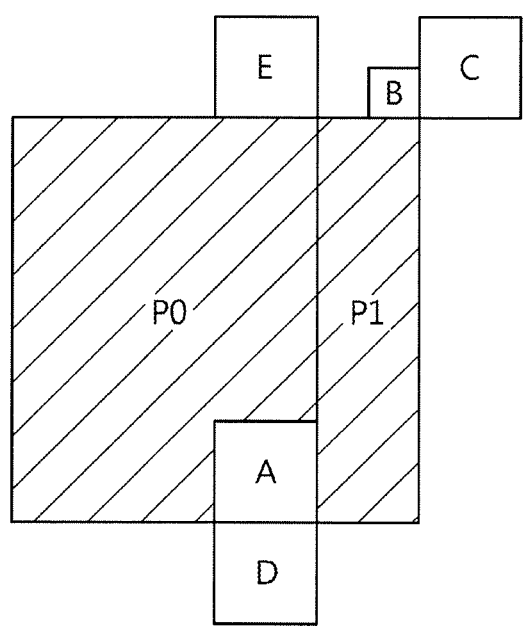
FIG. 6 is another conceptual diagram illustrating positions of spatial merge candidate blocks in another asymmetric partitioning mode according to the present invention.

FIG. 6 is another conceptual diagram illustrating positions of spatial merge candidate blocks in another asymmetric partitioning mode according to the present invention.

As shown in FIG. 6, a coding unit is partitioned into two asymmetric prediction blocks P0 and P1 and the partitioning mode is an nR×2N mode. The size of the block P0 is (2−h)N×2N and the size of the block P1 is hN×2N. The value of h is ½. The current block is the block P1. The blocks A, B, C, D and E are spatial merge candidate blocks. The block P0 is the spatial merge candidate block A.

In present invention, the spatial merge candidate A is set as unavailable not to be listed on the merge candidate list. Also, the spatial merge candidate block B, C, D or E having the same motion information of the spatial merge candidate block A is set as unavailable.

Figure 7:
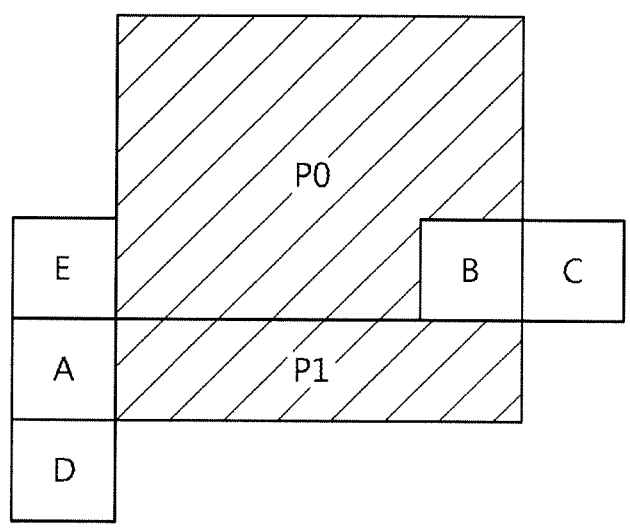
FIG. 7 is another conceptual diagram illustrating positions of spatial merge candidate blocks in another asymmetric partitioning mode according to the present invention.

FIG. 7 is another conceptual diagram illustrating positions of spatial merge candidate blocks in another asymmetric partitioning mode according to the present invention.

As shown in FIG. 7, a coding unit is partitioned into two asymmetric prediction blocks P0 and P1 and the partitioning mode is a 2N×nU mode. The size of the block P0 is 2N×hN and the size of the block P1 is 2N×(2−h)N. The value of h is ½. The current block is the block P1. The blocks A, B, C, D and E are spatial merge candidate blocks. The block P0 is the spatial merge candidate block B.

In present invention, the spatial merge candidate B is set as unavailable not to be listed on the merge candidate list. Also, the spatial merge candidate block C, D or E having the same motion information of the spatial merge candidate block B is set as unavailable.

Figure 8:
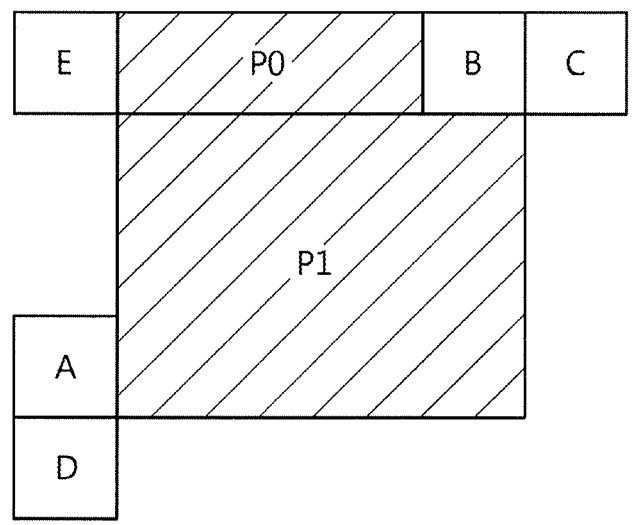
FIG. 8 is another conceptual diagram illustrating positions of spatial merge candidate blocks in another asymmetric partitioning mode according to the present invention.

FIG. 8 is another conceptual diagram illustrating positions of spatial merge candidate blocks in another asymmetric partitioning mode according to the present invention.

As shown in FIG. 8, a coding unit is partitioned into two asymmetric prediction blocks P0 and P1 and the partitioning mode is a 2N×nD mode. The size of the block P0 is 2N×(2−h)N and the size of the block P1 is 2N×hN. The value of h is ½. The current block is the block P1. The blocks A, B, C, D and E are spatial merge candidate blocks. The block P0 is the spatial merge candidate block B.

In present invention, the spatial merge candidate B is set as unavailable not to be listed on the merge candidate list. Also, the spatial merge candidate block C, D or E having the same motion information of the spatial merge candidate block B is set as unavailable.

The spatial merge candidate may also be set as unavailable based on merge area. If the current block and the spatial merge candidate block belong to same merge area, the spatial merge candidate block is set as unavailable. The merge area is a unit area in which motion estimation is performed and information specifying the merge area is included in a bit stream.

A temporal merge candidate is derived (S220). The temporal merge candidate includes a reference picture index and a motion vector of the temporal merge candidate.

The reference picture index of the temporal merge candidate may be derived using one or more reference picture indexes of neighboring block. For example, one of the reference picture indexes of a left neighboring block, an above neighboring block and a corner neighboring block is set as the reference picture index of the temporal merge candidate. The corner neighboring block is one of an above-right neighboring block, a left-below neighboring block and an above-left neighboring block. Alternatively, the reference picture index of the temporal merge candidate may be set to zero to reduce the complexity.

The motion vector of the temporal merge candidate may be derived as follows.

First, a temporal merge candidate picture is determined. The temporal merge candidate picture includes a temporal merge candidate block. One temporal merge candidate picture is used within a slice. A reference picture index of the temporal merge candidate picture may be set to zero.

If the current slice is a P slice, one of the reference pictures of the reference picture list 0 is set as the temporal merge candidate picture. If the current slice is a B slice, one of the reference pictures of the reference picture lists 0 and 1 is set as the temporal merge candidate picture. A list indicator specifying whether the temporal merge candidate picture belongs to the reference picture lists 0 or 1 is included in a slice header if the current slice is a B slice. The reference picture index specifying the temporal merge candidate picture may be included in the slice header.

Figure 9:
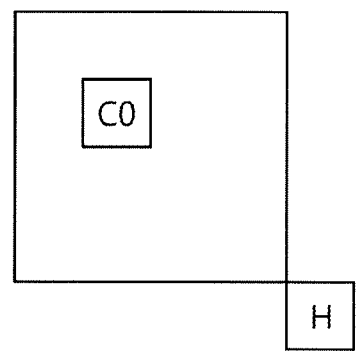
FIG. 9 is a conceptual diagram illustrating position of temporal merge candidate block according to the present invention.

Next, the temporal merge candidate block is determined. FIG. 9 is a conceptual diagram illustrating position of temporal merge candidate block according to the present invention. As shown in FIG. 9, a first candidate block may be a right-below corner block (block H) of the block C. The block C has same size and same location of the current block and is located within the temporal merge candidate picture. A second candidate block is a block covering an upper-left pixel of the center of the block C.

The temporal merge candidate block may be the first candidate block or the second candidate block. If the first candidate block is available, the first candidate block is set as the temporal merge candidate block. If the first candidate block is unavailable, the second candidate block is set as the temporal merge candidate block. If the second candidate block is unavailable, the temporal merge candidate block is set as unavailable.

The temporal merge candidate block is determined based on the position of the current block. For example, if the current block is adjacent to a lower LCU (that is, if the first candidate block belongs to a lower LCU), the first candidate block may be changed into a block within a current LCU or is set as unavailable.

Also, the first and second candidate blocks may be changed into another block based on each position of the candidate block within a motion vector storing unit. The motion vector storing unit is a basic unit storing motion information of reference pictures.

Figure 10:
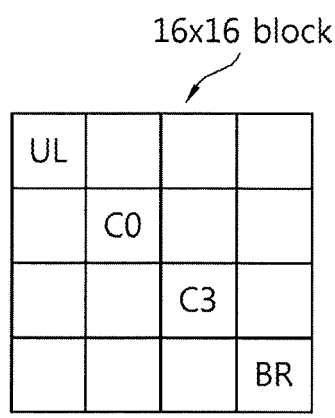
FIG. 10 is a conceptual diagram illustrating a method of storing motion information according to the present invention.

FIG. 10 is a conceptual diagram illustrating a method of storing motion information according to the present invention. As shown in FIG. 10, the motion storing unit may be a 16×16 block. The motion vector storing unit may be divided into sixteen 4×4 bocks. If the motion vector storing unit is a 16×16 block, the motion information is stored per the motion vector storing unit. If the motion vector storing unit includes multiple prediction units of reference picture, motion information of a predetermined prediction unit of the multiple prediction units is stored in memory to reduce amount of motion information to be stored in memory. The predetermined prediction unit may be a block covering one of the sixteen 4×4 blocks. The predetermined prediction unit may be a block covering a block C3, a block BR. Or the predetermined prediction unit may be a block covering a block UL.

Therefore, if the candidate block does not include the predetermined block, the candidate block is changed into a block including the predetermined block.

If the temporal merge candidate block is determined, the motion vector of the temporal merge candidate block is set as the motion vector of the temporal merge candidate.

A merge candidate list is constructed (S230). The available spatial candidates and the available temporal candidate are listed in a predetermined order. The spatial merge candidates are listed up to four in the order of A, B, C, D and E. The temporal merge candidate may be listed between B and C or after the spatial candidates.

It is determined whether one or more merge candidates are generated or not (S240). The determination is performed by comparing the number of merge candidates listed in the merge candidate list with a predetermined number of the merge candidates. The predetermined number may be determined per picture or slice.

If the number of merge candidates listed in the merge candidate list is smaller than a predetermined number of the merge candidates, one or more merge candidates are generated (S250). The generated merge candidate is listed after the last available merge candidate.

If the number of available merge candidates is equal to or greater than 2, one of two available merge candidates has list 0 motion information and the other has list 1 motion information, the merge candidate may be generated by combining the list 0 motion information and the list 1 motion information. Multiple merge candidates may be generated if there are multiple combinations.

One or more zero merge candidates may be added to the list. If the slice type is P, the zero merge candidate has only list 0 motion information. If the slice type is B, the zero merge candidate has list 0 motion information and list 1 motion information.

A merge predictor is selected among the merge candidates of the merge list, a merge index specifying the merge predictor is encoded (S260).

Figure 11:
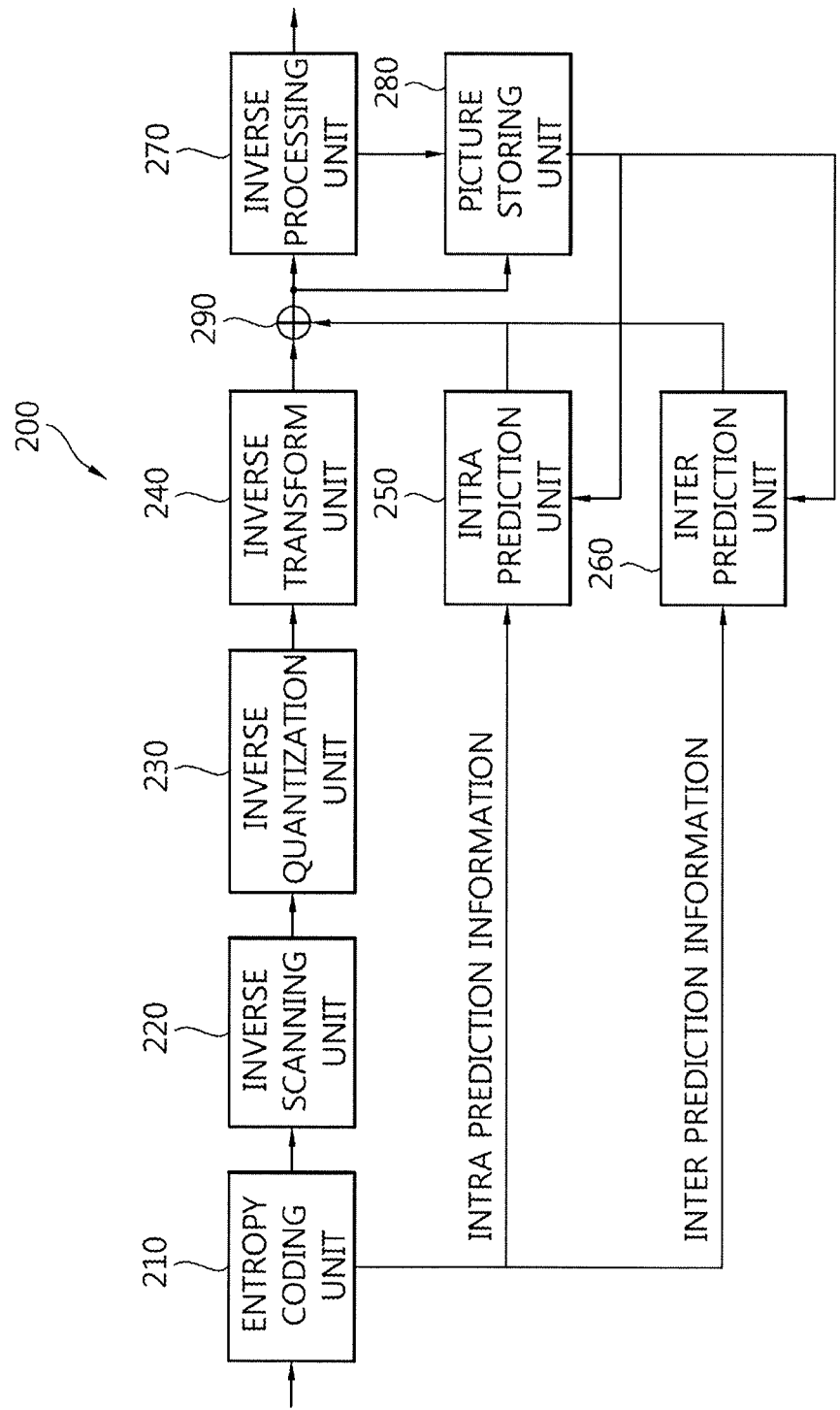
FIG. 11 is a block diagram of an image decoding apparatus 200 according to the present invention.

FIG. 11 is a block diagram of an image decoding apparatus 200 according to the present invention.

The image decoding apparatus 200 according to the present invention includes an entropy decoding unit 210, an inverse scanning unit 220, an inverse quantization unit 230, an inverse transform unit 240, an intra prediction unit 250, an inter prediction unit 260, a post-processing unit 270, a picture storing unit 280 and an adder 290.

The entropy decoding unit 210 extracts the intra prediction information, the inter prediction information and the quantized coefficient components from a received bit stream using a context-adaptive binary arithmetic decoding method.

The inverse scanning unit 220 applies an inverse scan pattern to the quantized coefficient components to generate quantized block. In inter prediction, the inverse scan pattern is a diagonal scan. The quantized coefficient components include the significant flags, the coefficient signs and the coefficients levels.

When the size of the transform unit is larger than the a predetermined size, the significant flags, the coefficient signs and the coefficients levels are inversely scanned in the unit of subset using the diagonal scan to generate subsets, and the subsets are inversely scanned using the diagonal scan to generate the quantized block. The predetermined size is equal to the size of the subset. The subset is a 4×4 block including 16 transform coefficients. The significant flags, the coefficient signs and the coefficient levels are inversely scanned in the reverse direction. The subsets are also inversely scanned in the reverse direction.

A parameter indicating last non-zero coefficient position and the non-zero subset flags are extracted from the bit stream. The number of encoded subsets is determined based on the parameter indicating last non-zero coefficient position. The non-zero subset flag is used to determine whether the corresponding subset has at least one non-zero coefficient. If the non-zero subset flag is equal to 1, the subset is generated using the diagonal scan. The first subset and the last subset are generated using the inverse scan pattern.

The inverse quantization unit 230 receives the differential quantization parameter from the entropy decoding unit 210 and generates the quantization parameter predictor to generate the quantization parameter of the coding unit. The operation of generating the quantization parameter predictor is the same as the operation of the quantization unit 150 of FIG. 1. Then, the quantization parameter of the current coding unit is generated by adding the differential quantization parameter and the quantization parameter predictor. If the differential quantization parameter for the current coding unit is not transmitted from an encoding side, the differential quantization parameter is set to zero.

The inverse quantization unit 230 inversely quantizes the quantized block.

The inverse transform unit 240 inversely transforms the inverse-quantized block to generate a residual block. An inverse transform matrix is adaptively determined according to the prediction mode and the size of the transform unit. The inverse transform matrix is a DCT-based integer transform matrix or a DST-based integer transform matrix. In inter prediction, the DCT-based integer transforms are used.

The intra prediction unit 250 derives an intra prediction mode of a current prediction unit using the received intra prediction information, and generates a prediction block according to the derived intra prediction mode.

The inter prediction unit 260 derives the motion information of the current prediction unit using the received inter prediction information, and generates a prediction block using the motion information.

The post-processing unit 270 operates the same as the post-processing unit 180 of FIG. 1.

The picture storing unit 280 receives post-processed image from the post-processing unit 270, and stores the image in picture units. A picture may be a frame or a field.

The adder 290 adds the restored residual block and a prediction block to generate a reconstructed block.

Figure 12:
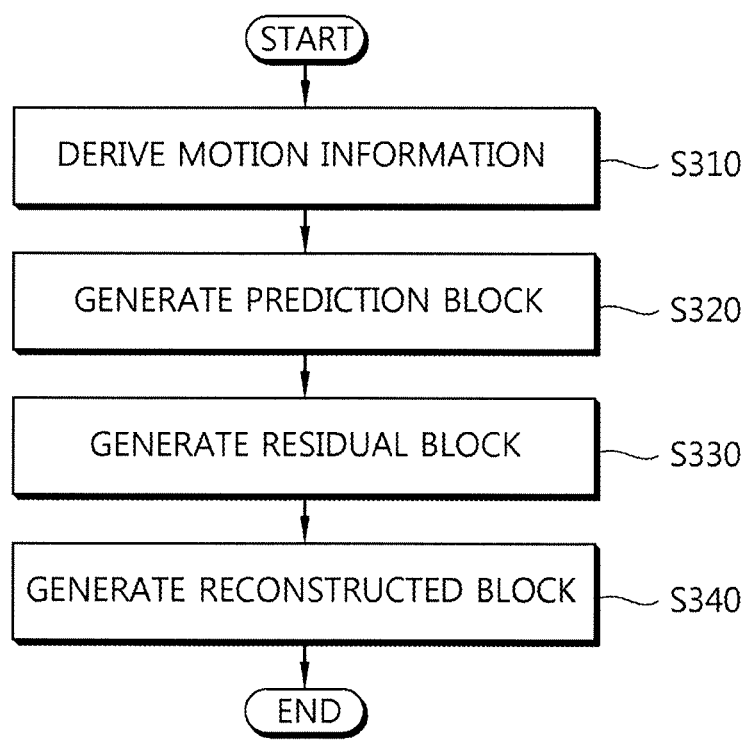
FIG. 12 is a flow chart illustrating a method of decoding an image in inter prediction mode according to the present invention.

FIG. 12 is a flow chart illustrating a method of decoding an image in inter prediction mode according to the present invention.

Motion information of a current block is derived (S310). The current block is a prediction unit. A size of the current block is determined by the size of the coding unit and the partitioning mode.

The motion information varies according to a prediction type. If the prediction type is a uni-directional prediction, the motion information includes a reference index specifying a picture of a reference list 0, and a motion vector. If the prediction type is a bi-directional prediction, the motion information includes a reference index specifying a picture of a reference list 0, a reference index specifying a picture of a reference list 1, and a list 0 motion vector and a list 1 motion vector.

The motion information is adaptively decoded according the coding mode of the motion information. The coding mode of the motion information is determined by a skip flag and a merge flag. If the skip flag is equal to 1, the merge flag does not exist and the coding mode is a skip mode. If the skip flag is equal to 0 and the merge flag is equal to 1, the coding mode is a merge mode. If the skip flag and the merge flag are equal to 0, the coding mode is an AMVP mode.

A prediction block of the current block is generated using the motion information (S320).

If the motion vector indicates a pixel position, the prediction block is generated by copying a block of the reference picture specified by the motion vector. If the motion vector indicates a sub-pixel position, the prediction block is generated by interpolating the pixels of the reference picture.

A residual block is generated (S330). The residual block is generated by the entropy decoding unit 210, the inverse scanning unit 220, the inverse quantization unit 230 and the inverse transform unit 240 of FIG. 11.

A reconstructed block is generated using the prediction block and the residual block (S340).

The prediction block has the same size of the prediction unit, and the residual block has the same size of the transform unit. Therefore, the residual signals and the prediction signals of same size are added to generate reconstructed signals.

Figure 13:
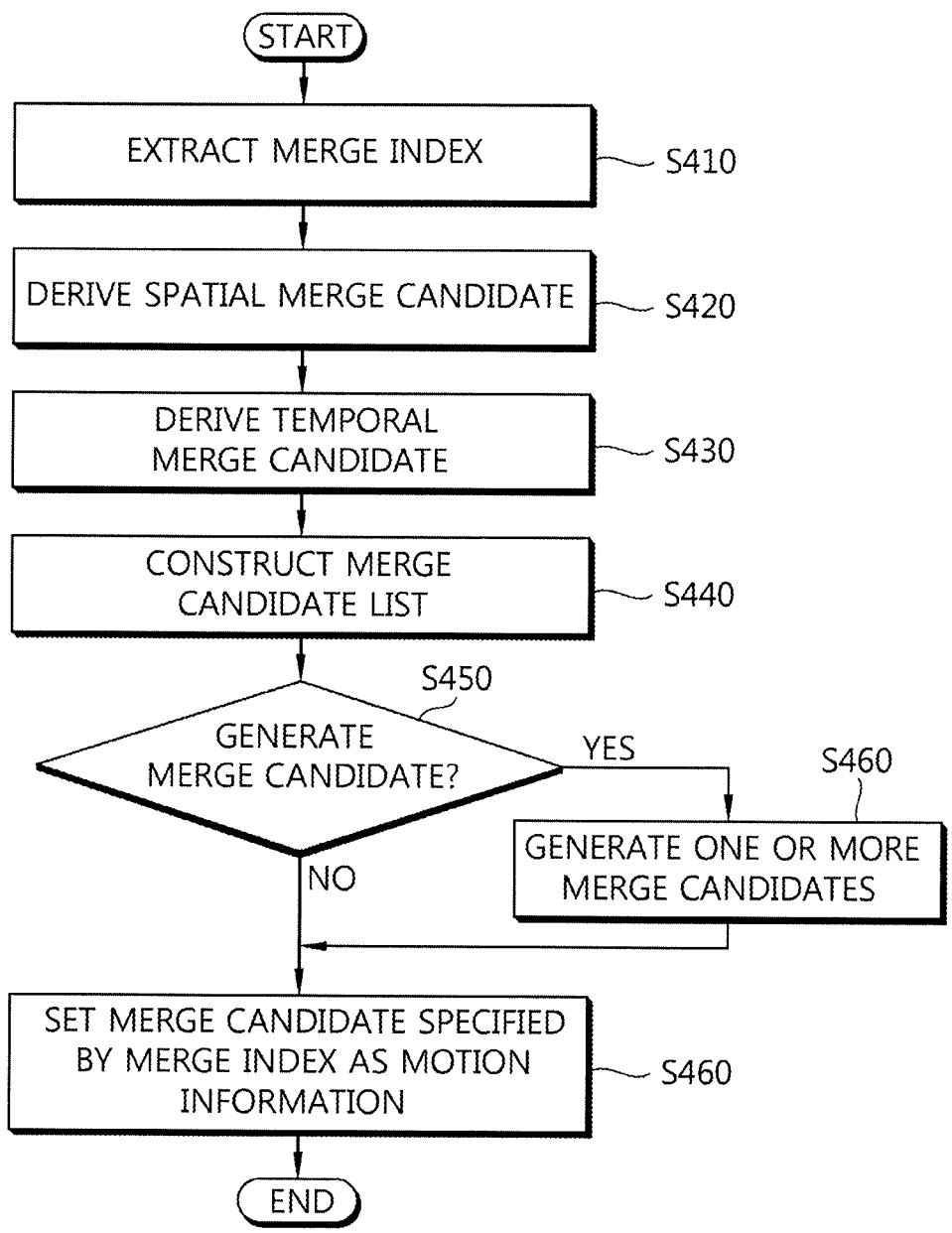
FIG. 13 is a flow chart illustrating a method of deriving motion information in merge mode.

FIG. 13 is a flow chart illustrating a method of deriving motion information in merge mode.

A merge index is extracted from a bit stream (S410). If the merge index does not exist, the number of merge candidates is set to one.

Spatial merge candidates are derived (S420). The available spatial merge candidates are the same as describe in S210 of FIG. 3.

A temporal merge candidate is derived (S430). The temporal merge candidate includes a reference picture index and a motion vector of the temporal merge candidate. The reference index and the motion vector of the temporal merge candidate are the same as described in S220 of FIG. 3.

A merge candidate list is constructed (S440). The merge list is the same as described in S230 of FIG. 3.

It is determined whether one or more merge candidates are generated or not (S450). The determination is performed by comparing the number of merge candidates listed in the merge candidate list with a predetermined number of the merge candidates. The predetermined number is determined per picture or slice.

If the number of merge candidates listed in the merge candidate list is smaller than a predetermined number of the merge candidates, one or more merge candidates are generated (S460). The generated merge candidate is listed after the last available merge candidate. The merge candidate is generated as the same method described in S250 of FIG. 3.

The merge candidate specified by the merge index is set as the motion information of the current block (S470).

Figure 14:
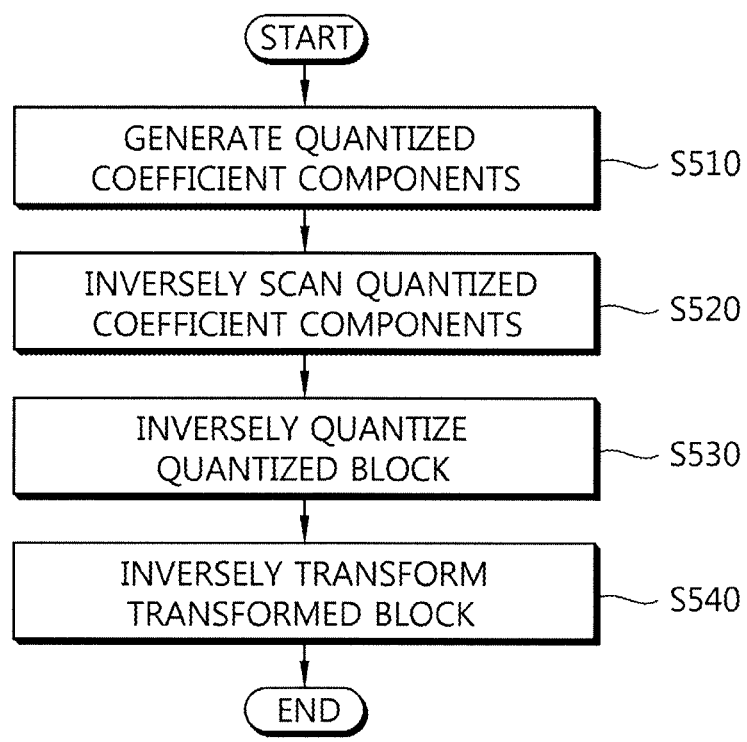
FIG. 14 is a flow chart illustrating a procedure of generating a residual block in inter prediction mode according to the present invention.

FIG. 14 is a flow chart illustrating a procedure of generating a residual block in inter prediction mode according to the present invention.

Quantized coefficient components are generated by the entropy decoding unit (S510).

A quantized block is generated by inversely scanning the quantized coefficient components according to the diagonal scan (S520). The quantized coefficient components include the significant flags, the coefficient signs and the coefficients levels.

When the size of the transform unit is larger than the a predetermined size, the significant flags, the coefficient signs and the coefficients levels are inversely scanned in the unit of subset using the diagonal scan to generate subsets, and the subsets are inversely scanned using the diagonal scan to generate the quantized block. The predetermined size is equal to the size of the subset. The subset is a 4×4 block including 16 transform coefficients. The significant flags, the coefficient signs and the coefficient levels are inversely scanned in the reverse direction. The subsets are also inversely scanned in the reverse direction.

The parameter indicating last non-zero coefficient position and the non-zero subset flags are extracted from the bit stream. The number of encoded subsets is determined based on the parameter indicating last non-zero coefficient position. The non-zero subset flags are used to determine whether the subset has at least one non-zero coefficient. If the non-zero subset flag is equal to 1, the subset is generated using the diagonal scan. The first subset and the last subset are generated using the inverse scan pattern.

The quantized block is inversely quantized using an inverse quantization matrix and a quantization parameter (S530).

Figure 15:
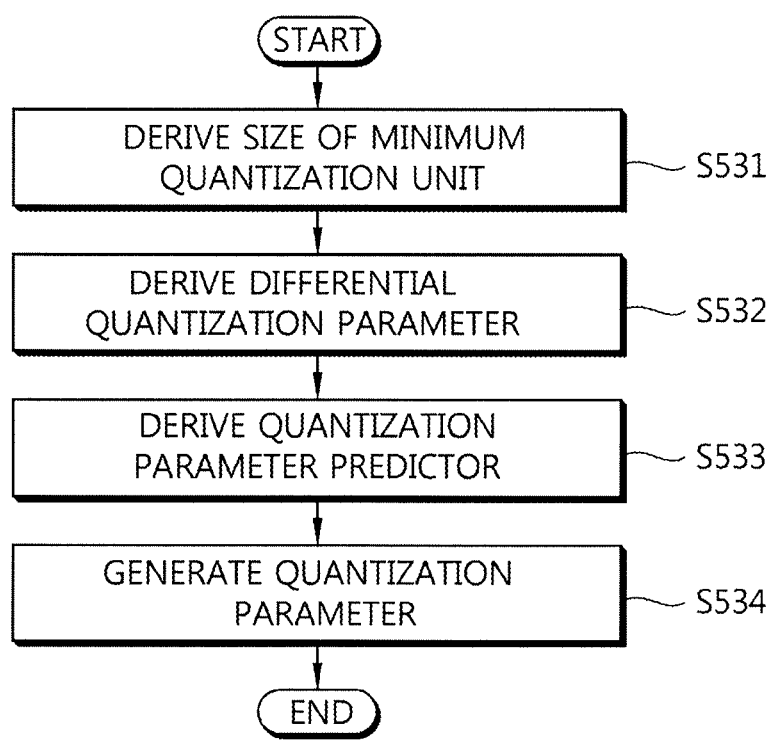
FIG. 15 is a flow chart illustrating a method of deriving a quantization parameter according to the present invention.

FIG. 15 is a flow chart illustrating a method of deriving a quantization parameter according to the present invention.

A minimum size of quantization unit is determined (S531). A parameter cu_qp_delta_enabled info specifying the minimum size is extracted from a bit stream, and the minimum size of the quantization unit is determined by the following equation.

$$\text{Log2(MinQUSize)}=\text{Log2(MaxCUSize)}-\text{cu\_qp\_delta\_enabled\_info}$$

The MinQUSize indicates the minimum size of the quantization unit, the MaxCUSize indicates the size of LCU. The parameter cu_qp_delta_enabled_info is extracted from a picture parameter set.

A differential quantization parameter of the current coding unit is derived (S532). The differential quantization parameter is included per quantization unit. Therefore, if the size of the current coding unit is equal to or larger than the minimum size of the quantization unit, the differential quantization parameter for the current coding unit is restored. If the differential quantization parameter does not exist, the differential quantization parameter is set to zero. If multiple coding units belong to a quantization unit, the first coding unit containing at least one non-zero coefficient in the decoding order contains the differential quantization unit.

A coded differential quantization parameter is arithmetically decoded to generate bin string indicating the absolute value of the differential quantization parameter and a bin indicating the sign of the differential quantization parameter. The bin string may be a truncated unary code. If the absolute value of the differential quantization parameter is zero, the bin indicating the sign does not exist. The differential quantization parameter is derived using the bin string indicating the absolute value and the bin indicating the sign.

A quantization parameter predictor of the current coding unit is derived (S533). The quantization parameter predictor is generated by using quantization parameters of neighboring coding units and quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameter are available, the average of the left and above quantization parameter is set as the quantization parameter predictor. If only one of the left and above quantization parameter is available, the average of the available quantization parameter and the previous quantization parameter is set as the quantization parameter predictor. If both of the left and above quantization parameter are unavailable, the previous quantization parameter is set as the quantization parameter predictor.

If multiple coding units belong to a quantization unit of minimum size, the quantization parameter predictor for the first coding unit in decoding order is derived and used for the other coding units.

The quantization parameter of the current coding unit is generated using the differential quantization parameter and the quantization parameter predictor (S534).

A residual block is generated by inverse-transforming the inverse-quantized block (S540). One dimensional horizontal and vertical inverse DCT based-transforms are used.

While the invention has been shown and described with reference to certain exemplary embodiments thereof, it will be understood by those skilled in the art that various changes in form and details may be made therein without departing from the spirit and scope of the invention as defined by the appended claims.

What is claimed:

1. A method of encoding video data in a merge mode, the method comprising:
    determining motion information of a current block;
    generating a prediction block of the current block using the motion information;
    generating a residual block using the current block and the prediction block;
    transforming the residual block to generate a transformed block;
    quantizing the transformed block using a quantization parameter and a quantization matrix to generate a quantized block;
    scanning coefficient components of the quantized block using a diagonal scan;
    entropy-coding the scanned coefficient components of the quantized block; and
    encoding the motion information,
    wherein encoding the motion information comprises the sub-steps of:
        constructing a merge list using available spatial and temporal merge candidates;
        selecting a merge predictor among merge candidates of the merge list; and
        encoding a merge index specifying the merge predictor,
    wherein when the current block is a second prediction unit partitioned by asymmetric partitioning, the spatial merge candidate corresponding to a first prediction unit partitioned by the asymmetric partitioning is not to be listed on the merge list, and
    wherein the quantization parameter is determined per a quantization unit and is encoded using a quantization parameter predictor,
    a minimum size of the quantization unit is adjusted by a picture parameter set,
    if two or more quantization parameters are available among a left quantization parameter, an above quantization parameter and a previous quantization parameter of a current coding unit, the quantization parameter predictor is generated using first two available quantization parameters among the left quantization parameter, the above quantization parameter and the previous quantization parameter, and
    if only one is available among the left quantization parameter, the above quantization parameter and the previous quantization parameter, the available quantization parameter is set as the quantization parameter predictor.

2. The method of claim 1, wherein an average of first two available quantization parameters among the left quantization parameter, the above quantization parameter and the previous quantization parameter is set as the quantization parameter predictor if at least two of a left quantization parameter, an above quantization parameter and a previous quantization parameter are available.

3. The method of claim 1, wherein a reference picture index of the temporal merge candidate is set as 0.

4. The method of claim 1, wherein the motion vector of the temporal merge candidate is a motion vector of a temporal merge candidate block within a temporal merge candidate picture, and a position of the temporal merge candidate block is determined depending on the position of the current block within the LCU.

5. The method of claim 4, wherein the motion vector of the temporal merge candidate is a motion vector of a motion vector storing unit corresponding to the position of the temporal merge candidate block.

6. The method of claim 5, wherein a size of the motion vector storing unit is 16×16.

* * * * *